United States Patent [19]

Ohtaka et al.

[11] Patent Number: 4,992,819
[45] Date of Patent: Feb. 12, 1991

[54] FOCUS DETECTING DEVICE HAVING A PLURALITY OF DETECTING AREAS AND CAMERA PROVIDED WITH THE SAME

[75] Inventors: Keiji Ohtaka; Takeshi Koyama, both of Yokohama; Yasuo Suda, Kawasaki, all of Japan

[73] Assignee: Canon Kabushiki Kaisha, Tokyo, Japan

[21] Appl. No.: 429,607

[22] Filed: Oct. 31, 1989

[51] Int. Cl.⁵ .............................................. G03B 13/00
[52] U.S. Cl. ...................................................... 354/408
[58] Field of Search ................. 354/402, 403, 406–408

[56] References Cited

U.S. PATENT DOCUMENTS

| 4,774,539 | 9/1988 | Suda et al. | 354/406 |
|---|---|---|---|
| 4,843,415 | 6/1989 | Matsui et al. | 354/403 |
| 4,859,842 | 8/1989 | Suda et al. | 354/408 |
| 4,878,078 | 10/1989 | Koyama et al. | 354/402 |
| 4,878,079 | 10/1989 | Hamada et al. | 354/402 |

FOREIGN PATENT DOCUMENTS

| 59-107311 | 6/1984 | Japan . |
|---|---|---|
| 59-107313 | 6/1984 | Japan . |
| 62-78134 | 4/1987 | Japan . |
| 62-138808 | 6/1987 | Japan . |
| 62-189415 | 8/1987 | Japan . |
| 62-279835 | 12/1987 | Japan . |

Primary Examiner—L. T. Hix
Assistant Examiner—David M. Gray
Attorney, Agent, or Firm—Fitzpatrick, Cella, Harper & Scinto

[57] ABSTRACT

In a focus detecting device, a plurality of distributions of quantity of light regarding the image of an object to be photographed are formed by optical means disposed on the image plane side of an objective lens by the use of light beams passed through different areas of the pupil of the objective lens. The relative positional relation between the plurality of distributions of quantity of light is found by light receiving means, and the in-focus state of the objective lens is found by the use of a signal from the light receiving means. The optical means has at least three pairs of secondary imaging lenses each forming a pair of light distributions corresponding to the image of the object to be photographed, and is constructed so that at least two of the light segments passing through the vertices of the lens surfaces of the pairs of secondary imaging lenses intersect each other and at least one other light segment does not intersect.

18 Claims, 13 Drawing Sheets

FOCUS DETECTING DEVICE HAVING A PLURALITY OF DETECTING AREAS AND CAMERA PROVIDED WITH THE SAME

BACKGROUND OF THE INVENTION

1. Field of the Invention

This invention relates to a focus detecting device suitable for a photographic camera, a video camera or the like, and more particularly to a focus detecting device suitable when detecting the in-focus state of an objective lens by dividing the pupil of the objective lens into a plurality of areas, forming distributions of a quantity of light regarding a plurality of object images by the use of light beams passing through the areas, and finding the relative positional relation between these distributions of the quantity of light.

2. Related Background Art

Among the light receiving type focus detecting systems utilizing a light beam passed through an objective lens, there is a system called the image deviation type.

This image deviation type system is proposed, for example, in Japanese Laid-Open Patent Application Nos. 59-107311, 59-107313 etc.

FIG. 9 of the accompanying drawings is a schematic view of the optical system of a focus detecting device using the prior-art image deviation system.

In FIG. 9, the reference numeral 61 designates an objective lens, and the reference numeral 62 denotes a field mask disposed near the predetermined imaging plane of the objective lens 61. The reference numeral 63 designates a field lens disposed near the predetermined imaging plane. The reference numeral 64 denotes a secondary optical system comprised of two lenses 64-1 and 64-2 disposed symmetrically with respect to the optic axis of the objective lens 61. The reference numeral 65 designates light receiving means having two light receiving element arrays 65-1 and 65-2 disposed rearwardly of said two lenses 64-1 and 64-2 correspondingly thereto. The reference numeral 66 denotes a stop having two opening portions 66-1 and 66-2 disposed forwardly of said two lenses 64-1 and 64-2 correspondingly thereto. The reference numeral 67 designates the exit pupil of the objective lens 61 which is comprised of two divided areas 67-1 and 67-2.

The field lens 63 has the function of imaging the opening portions 66-1 and 66-2 on the areas 67-1 and 67-2, respectively, of the exit pupil 67, and light beams transmitted through the areas 67-1 and 67-2 may form distributions of the quantity of light on the light receiving element arrays 65-1 and 65-2, respectively.

In the focus detecting device shown in FIG. 9, when the imaging point of the objective lens 61 lies forwardly of the predetermined imaging plane, the distributions of the quantity of light regarding the object images formed on the two light receiving element arrays 65-1 and 65-2 are close to each other, and when the imaging point of the objective lens 61 lies rearwardly of the predetermined imaging plane, the distributions of the quantity of light formed on the two light receiving element arrays 65-1 and 65-2 are far from each other. Moreover, the amount of deviation between the distributions of the quantity of light formed on the two light receiving element arrays 65-1 and 65-2 has a functional relation with the amount of out-of-focus of the objective lens 61 and therefore, if that amount of deviation is calculated by suitable calculating means, the direction and amount of the out-of-focus of the objective lens 61 can be detected.

The assignee of the present invention has further developed this art and has disclosed in Japanese Laid-Open Patent Application No. 62-138808 an arrangement in which a pair of secondary imaging lenses and a pair of light receiving element arrays are disposed not only horizontally but also vertically, thereby coping with a pattern which is otherwise unsuitable for detection.

The focus detecting device shown in FIG. 9 effects distance measurement for an object existing substantially centrally of the object range which is photographed by the objective lens.

In contrast, the applicant has previously proposed in Japanese Patent Application No. 62-279835 a focus detecting device which selects any one distance measuring point from among a plurality of distance measuring points outside the central portion of the photographing range and effects focus detection.

FIG. 10 of the accompanying drawings is a view of a focus detecting device for a plurality of distance measuring points proposed in the aforementioned Japanese Patent Application No. 62-279835. In FIG. 10, the reference numeral 71 designates a field mask, the reference numeral 72 denotes a field lens, the reference numeral 73 designates a stop having two openings 73-1 and 73-2, the reference numeral 74 denotes a secondary optical system comprising two lenses 74-1 and 74-2, and the reference numeral 75 designates a sensor. The objective lens 61 shown in FIG. 9 is omitted.

In FIG. 10, the field mask 71 has a plurality of openings 71a–71e corresponding to a plurality of fields of view to be distance-measured, and pairs of sensor arrays 75a1 and 75a2, 75b1 and 75b2, 75c1 and 75c2, 75d1 and 75d2, and 75e1 and 75e2 are provided as sensors 75 so as to receive pairs of the distributions of quantity of light which the light beam controlled by the field mask 71 forms by the secondary optical system 74.

In FIG. 10, distance measurement is effected at five areas, i.e., at the central portion of the photographing picture plane and four locations on both sides thereof. It is very important when the focus detecting device is applied to a camera that focus detection can be accomplished at a plurality of areas in the photographing picture plane by such a simple construction.

On the other hand, Japanese Laid-Open Patent Application No. 62-189415 proposes various examples of the arrangement of sensor arrays, and a more concrete construction is disclosed, for example, in Japanese Laid-Open Patent Application No. 62-78134. In this laid-open patent application, a long sensor array divided into two areas is disposed in an H-shape so as to be able to cope with a variety of objects to be photographed. However, even with this arrangement, it is necessary to pan the camera a little and effect detection by the use of the vertically arranged sensor array and return the direction of the camera to the original direction when the object at the center of the picture plane which is most often photographed is a pattern unsuitable for detection.

A technique related to the field lens of the focus detecting device is proposed in U.S. patent application Ser. No. 266,804.

SUMMARY OF THE INVENTION

It is an object of the present invention to make it possible to effectively cope with an object to be photographed having a pattern unsuitable for detection, and also to enable detection to be accomplished not only when the object to be photographed lies at the center of the picture plane, but also when the object lies off the center of the picture plane.

When detection is difficult because of the low contrast or the low luminance or both of an object to be photographed, it is practised even in a camera provided with a passive type focus detecting device to project auxiliary illuminating light toward the object to be photographed.

It is another object of the present invention to provide a construction suitable for effecting auxiliary illumination and thereby accomplishing focus detection.

It is still another object of the present invention to eliminate the difficulty that a focus detecting device having a plurality of detecting areas becomes bulky and unsuitable for being incorporated into a camera.

It is yet still another object of the present invention to provide a device in which it is difficult for detection accuracy to be degraded even if a change occurs in the environment.

DESCRIPTION OF THE PREFERRED EMBODIMENTS

Figure 1:
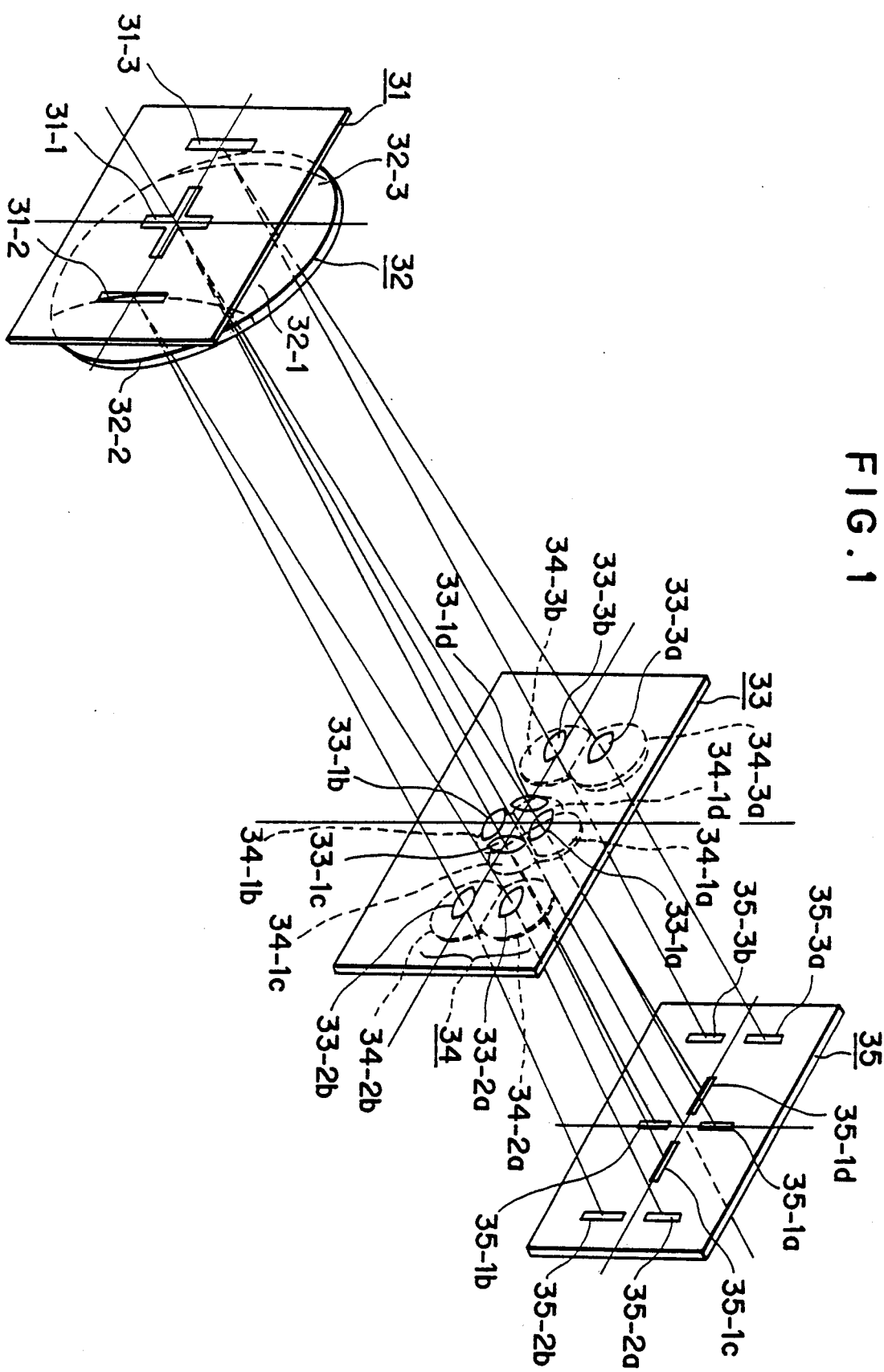
FIG. 1 is a perspective view showing an optical system in an embodiment of the present invention.

FIG. 1 is a schematic view showing the essential portions of an embodiment of the present invention. In FIG. 1, the reference numeral 31 designates a field mask having, for example, a cruciform opening 31-1 intersecting substantially the center of the photographing picture plane by of an objective lens (photographing lens), not shown, and vertically long openings 31-2 and 31-3 on both sides of the cruciform opening. The reference numeral 32 denotes a field lens comprising three areas 32-1, 32-2 and 32-3 (each having a predetermined optical characteristic) corresponding to the three openings 31-1, 31-2 and 31-3 in the field mask 31. The reference numeral 33 designates a stop whose central portion is provided with vertical and horizontal pairs of openings 33-1a, 33-1b, 33-1c and 33-1d and whose right and left marginal portions are provided with a pair of openings 33-2a and 33-2b and a pair of openings 33-3a and 33-3b, respectively. The areas 32-1, 32-2 and 32-3 of the field lens 32 have the function of imaging the pairs of openings 33-1, 33-2 and 33-3 in the stop 33 near the exit pupil of the photographing lens, not shown. The reference numeral 34 denotes a secondary optical system having four pairs of secondary imaging lenses as a whole. That is, as a whole, it comprises eight secondary imaging lenses 34-1a, 34-1b, 34-1c, 34-1d, 34-2a, 34-2b, 34-3a and 34-3b disposed rearwardly of the respective openings in the stop 33.

A segment passing through the vertices of the lens surfaces of the pair of secondary imaging lenses 34-1a and 34-1b and a segment passing through the vertices of the lens surfaces of the pair of secondary imaging lenses 34-1c and 34-1d are orthogonal to each other (though these segments need not always be made orthogonal to each other), and are designed so as not to intersect a segment passing through the vertices of the lens surfaces of other pair of secondary imaging lenses, e.g. 34-2a and 34-2b. The reference numeral 35 designates a light receiving element array (sensor) having four pairs of sensor arrays as a whole. That is, as a whole, it comprises eight sensor arrays, 35-1a, 35-1b, 35-1c, 35-1d, 35-2a, 35-2b, 35-3a and 35-3b, which are arranged corresponding to the secondary imaging lenses so as to receive the images thereof. For example, the sensor arrays 35-1a and 35-1b, and 35-2a and 35-2b may be a single sensor array electrically divided into two portions. Also, the surroundings of each sensor array have a lightabsorbing paint applied thereto to prevent reflected light from becoming noise.

Figure 2:
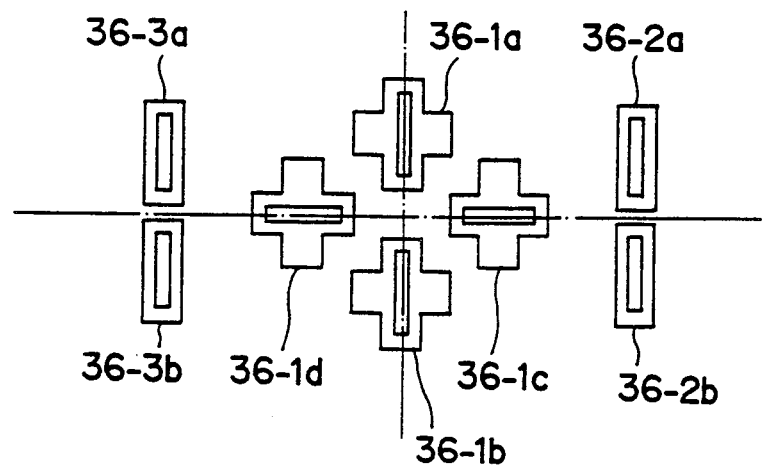
FIG. 2 is an illustration of the sensor surface of FIG. 1.

FIG. 2 is an illustration showing image areas formed on the surface of the sensor 35 of FIG. 1. Areas 36-1a, 36-1b, 36-1c and 36-1d are the image areas of the central opening 31-1 in the field mask 31, and respectively show a state in which a light beam transmitted through the central portion 32-1 of the field lens 32 is controlled by the openings 33-1a, 33-1b, 33-1c and 33-1d in the stop 33, whereafter it is formed on the surface of the sensor 35 by the secondary imaging lenses 34-1a, 34-1b, 34-1c and 34-1d rearward of said openings. Also, the reference characters 36-2a and 36-2b denote the image areas of the opening 31-2 around the field mask 31, and these image areas show a state in which a light beam transmitted through the marginal portion 32-2 of the field lens 32 is controlled by the openings 33-2a and 33-2b in the stop 33, whereafter it is formed on the sensor 35 by the secondary imaging lenses 34-2a and 34-2b rearward of said openings. Likewise, the reference characters 36-3a and 36-3b designate the image areas of the opening 31-3 around the field mask 31, and these image areas show a state in which a light beam transmitted through the marginal portion 32-3 of the field lens 32 is controlled by the openings 33-3a and 33-3b in the stop 33, whereafter it is formed on the surface of the sensor 35 by the secondary imaging lenses 34-3a and 34-3b rearward of said openings.

The principle of distance measurement of the focus detecting device according to the embodiment of the present invention shown in FIG. 1 is achieved by detecting the relative position of the images in the direction of the array of sensors forming a pair, as in the conventional so-called image deviation system.

In the present embodiment, by adopting the construction as described above, it becomes possible to effect distance measurement even for an object to be photographed in which the distribution of the quantity of light changes only in one direction, i.e., vertical direction or horizontal direction, in the vicinity of the photographing range photographed or observed by the objective lens, not shown, and it also becomes possible to effect distance measurement for an object which lies at a position off the center, for example, a position horizontally spaced apart from the center.

In the present embodiment, the design may also be made such that only the central portion and one marginal portion are distance-measured by the use of three pairs of secondary imaging lenses. The design may also be made such that the marginal portion as well as the central portion can be distance-measured in horizontal and vertical directions.

Figure 3:
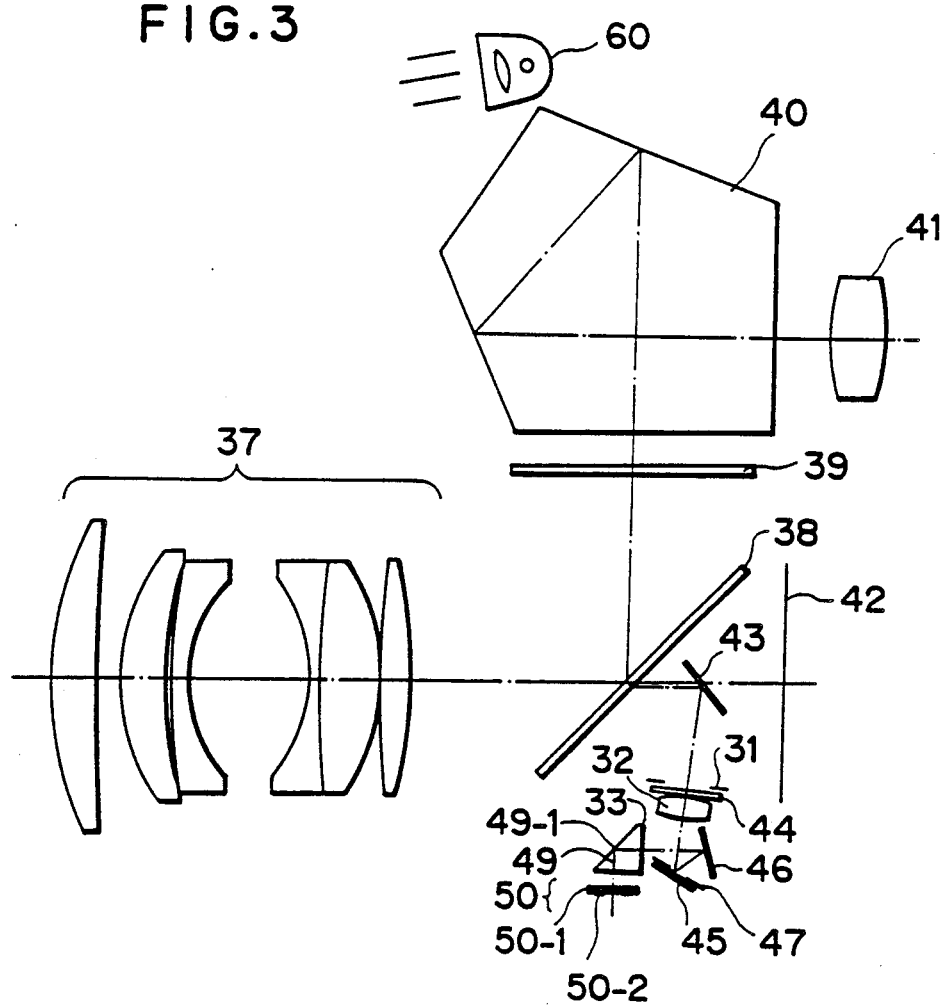
FIG. 3 is a longitudinal cross-sectional view of an embodiment when the present invention is applied to a single-lens reflex camera.

FIG. 3 shows the cross-sectional shape of an embodiment when the focus detecting device of the present invention is applied to a single-lens reflex camera. In FIG. 3, elements identical to those shown in FIG. 1 are given identical reference characters. The housing of the camera is not shown.

In FIG. 3, the reference numeral 37 designates a photographing lens (objective lens) which is mountable on or fixed to the camera body. The reference numeral 38 denotes a quick return mirror, the reference numeral 39 designates a focusing screen, the reference numeral 40 denotes a pentagonal roof prism, the reference numeral 41 designates an eyepiece, the reference numeral 42 denotes a film surface, and the reference numeral 43 designates a submirror. It is to be understood that the submirror 43 is coupled to a portion of the quick return mirror 38. The reference numeral 31 denotes a field mask disposed at a position optically substantially equivalent to the film surface 42. The reference numeral 44 designates an infrared cut filter disposed rearwardly of the field mask 31. The reference numeral 32 denotes a field lens, the reference numerals 45 and 46 designate first and second total reflection mirrors, respectively, the reference numeral 47 denotes a light intercepting mask, the reference numeral 33 designates a quantity-of-light stop, and the reference numeral 48 denotes a secondary optical system formed integrally with a prism member 49 which will be described later. The prism member 49 has a reflecting surface 49-1. The reference numeral 50 designates a sensor having cover glass 50-1 and a light receiving surface 50-2. The reference numeral 60 denotes an auxiliary light projector.

In the present embodiment, the apparatus from the field mask 31 to the sensor 50 corresponds to the focus detecting device shown in FIG. 1.

In FIG. 3, the optical path of the focus detecting optical system is bent by the use of three reflecting surfaces 45, 46 and 49-1, whereby the full length of the focus detecting optical system, particularly, the spacing between the field lens 32 and the stop 33, is kept great. As previously described, the field lens 32 has the function of imaging the stop 33 near the exit pupil of the photographing lens 37, but by making the spacing between the field lens 32 and the stop 33 great, it becomes possible to keep this imaging relation good and thus, a brighter light beam can be directed to the focus detecting device.

Figure 4:
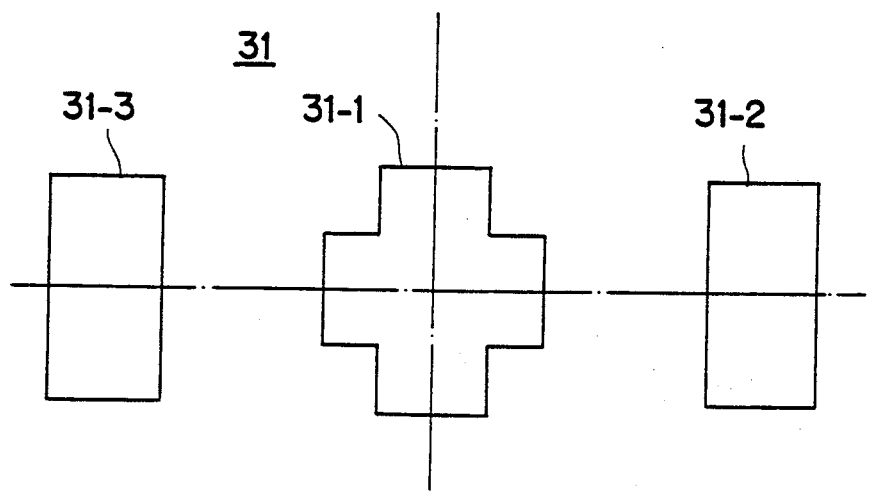
FIGS. 4 to 8 illustrate the various constituent members of FIG. 3.

FIG. 4 is an illustration showing an embodiment of the opening shape of the field mask 31. As described with reference to FIG. 1, a cruciform opening 31-1 is provided at the center and vertically long rectangular openings 31-2 and 31-3 are provided in the marginal portions.

Figure 5:
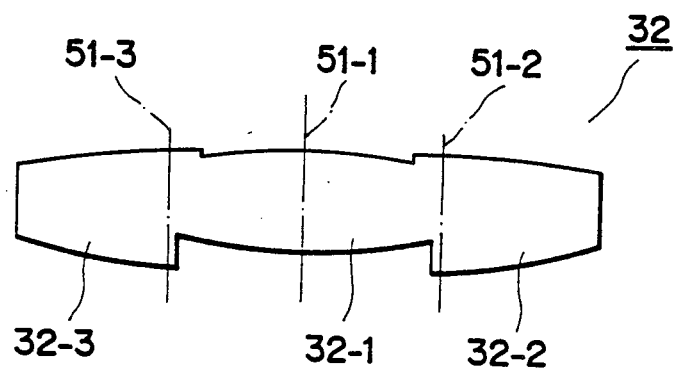

FIG. 5 is a schematic view of an embodiment of the field lens. This Figure shows a cross-section of the field lens 32 of FIG. 3 taken along a plane containing the optic axis thereof and perpendicular to the plane of the drawing sheet. The optic axes 51-1, 51-2 and 51-3 of lenses 32-1, 32-2 and 32-3 comprising three areas 32-1, 32-2 and 32-3 corresponding to the three openings 31-1, 31-2 and 31-3 in the field mask 31 and constituting marginal areas lie at positions deviated from the center 51-1. Also, it is effective to make each lens surface aspherical in order to enhance the performance of the field lens 32. Particularly, by forming at least one of the front and rear surfaces of the lenses 32-2 and 32-3 in the marginal portion by an aspherical surface, the quantity of light entering the focus detecting system from the marginal field of view can be increased.

Figure 6:
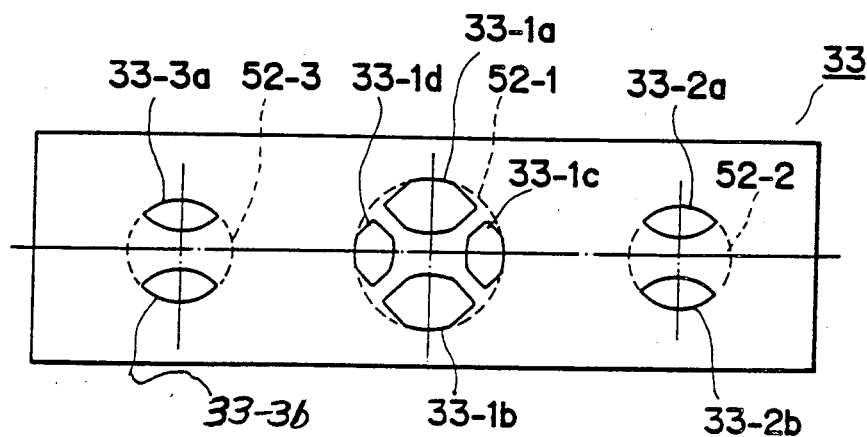

FIG. 6 is an illustration showing an embodiment of the opening shape of the stop 33. The central opening is comprised of vertical and horizontal pairs of openings 33-1a, 33-1b, 33-1c and 33-1d inscribed in a substantially circular area 52-1. The openings in the right and left marginal portions are also comprised of a vertical pair of openings 33-2a and 33-2b and a vertical pair of openings 33-3a and 33-3b inscribed in substantially circular areas 52-2 and 52-3, respectively. In the central portion, the upper and lower openings 33-1a and 33-1b are larger than the right and left openings 33-1c and 33-1d. This is due to the circumstances as will be described below.

That is, in a camera using a focus detecting device, there is often adopted a system in which when the luminance and contrast of the object to be photographed are low, auxiliary light is projected onto the object side and distance measurement is effected by a pattern projected onto the object to be photographed. In such case, it is necessary to project a pattern of lateral stripes upon the marginal field of view of the photographing picture plane, and it makes the construction of the light projecting system simpler to project a similar pattern of lateral stripes upon the central field of view as well. Accordingly, in the central field of view, it will result in the possibility of more effectively achieving the purpose of auxiliary light of enlarging the low luminance limit to make the upper and lower openings large so that more of a light beam enabling distance measurement is directed to the lateral stripes.

Figure 7:
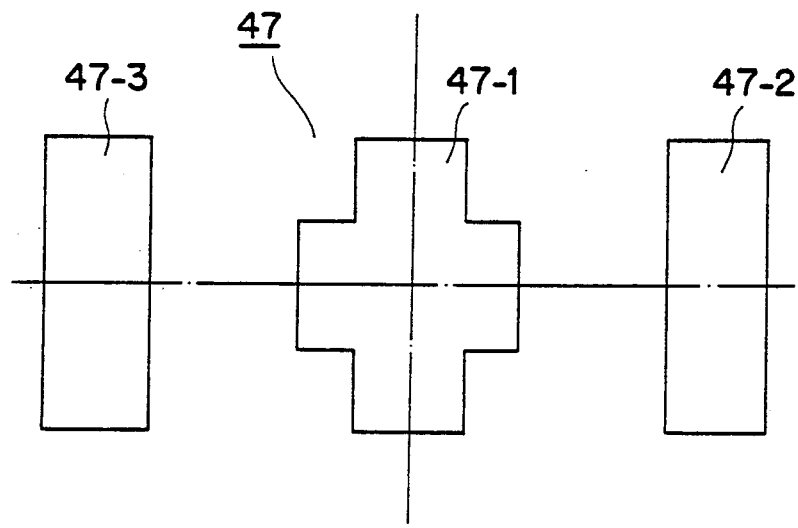

FIG. 7 is a schematic view showing the shapes of openings 47-1, 47-2 and 47-3 in an embodiment of the light intercepting mask 47 of FIG. 3. This light intercepting mask 47 serves to prevent undesirable light which enters the opening 31-2 or 31-3 in the marginal portion of the field mask 31 of FIGS. 1 to 4 and does not pass through the openings 33-2a, 33-2b, 33-3a and 33-3b in the marginal portion of the stop 33 but passes through the openings 33-1a, 33-1b, 33-1c and 33-1d in the central portion from reaching the surface of the sensor 35. Said undesirable light reaches the portion between the openings 47-1 and 47-2 or 47-1 and 47-3 in the light intercepting mask 47 and is intercepted thereby.

The light intercepting mask 47 may be provided, instead of at this position, immediately forward of the second reflecting mirror 46 of FIG. 3, or rearward of the field lens 32, or forward of the stop 33. Where the light cannot be completely intercepted by a single light intercepting mask, some of such masks may combined together for use. Also, instead of providing the light intercepting mask immediately forward of the first and second mirrors 45 and 46, the reflecting surfaces of the same mirrors may be patternized so that light may be absorbed by or transmitted through other portions than the necessary portion.

Figure 8:
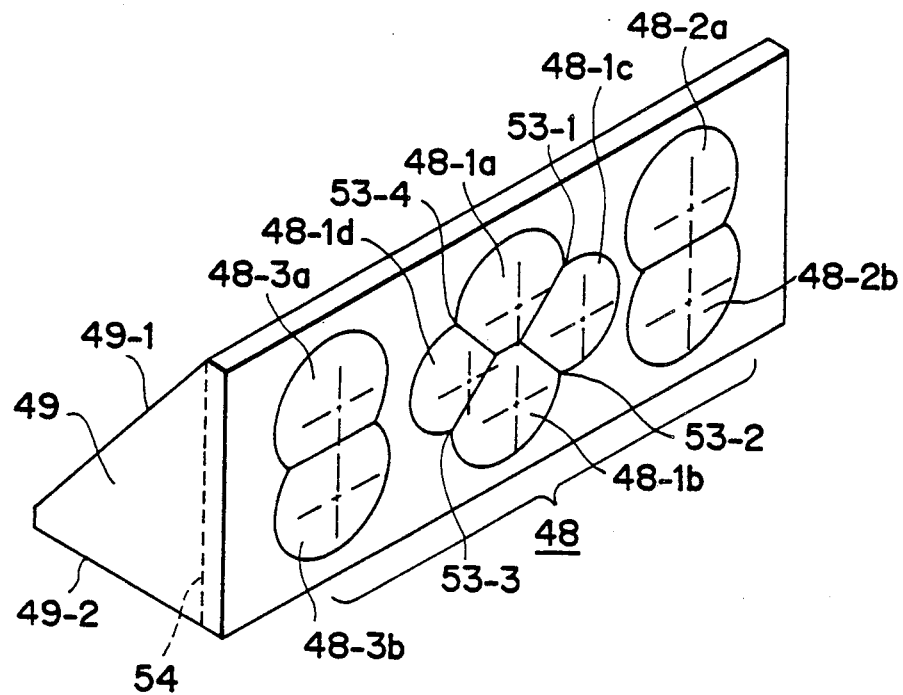
Figure 9:
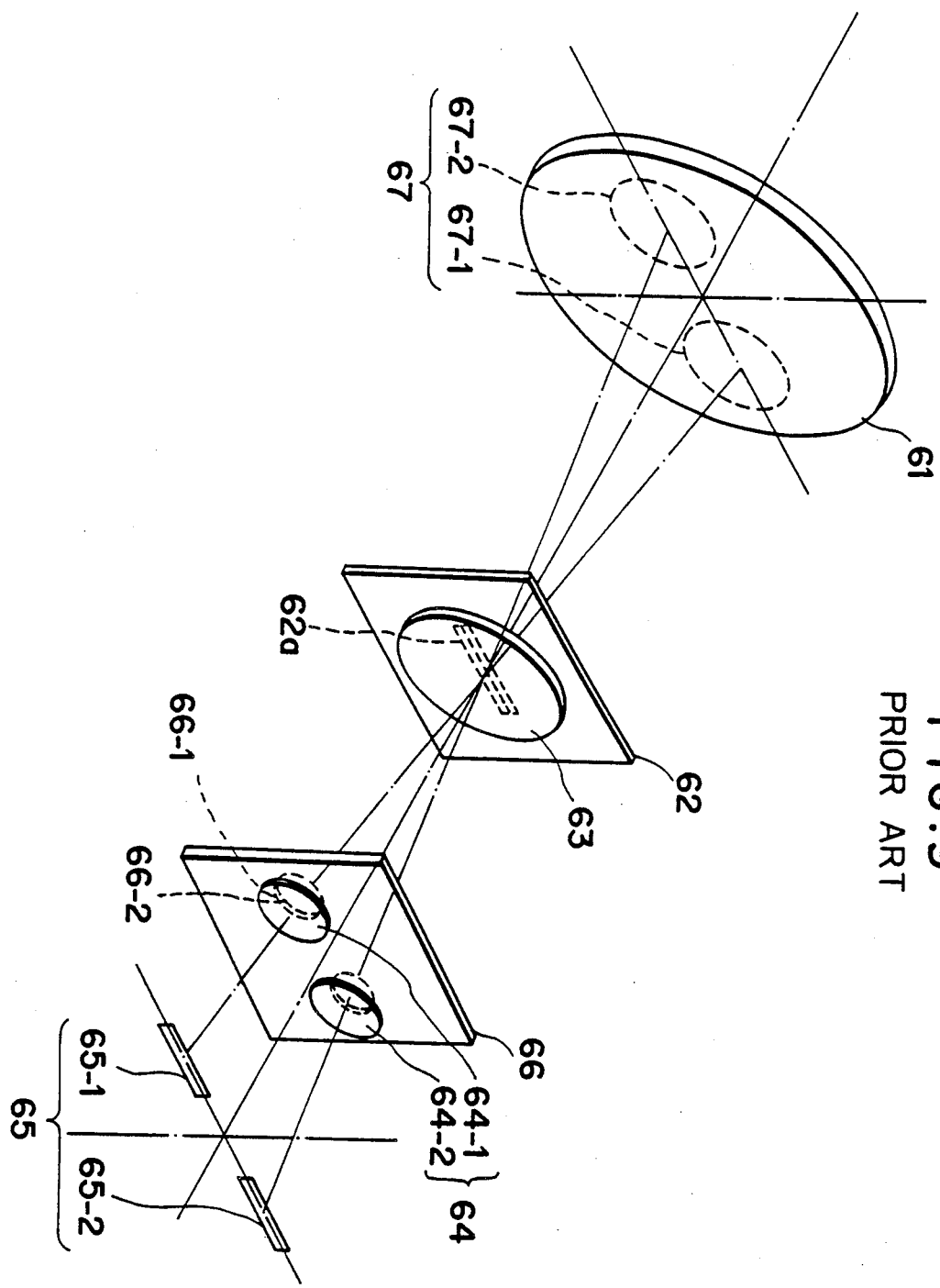
FIGS. 9 and 10 are perspective views of the focus detecting device according to the prior art.

FIG. 8 is a perspective view showing the secondary optical system 48 and prism member 49 of FIG. 3. The secondary optical system 48 comprises four pairs of secondary imaging lenses 48-1a and 48-1b, 48-1c and 48-1d, 48-2a and 48-2b, and 48-3a and 48-3b of positive refractive power, and is made integral with the prism member 49. The prism member 49 has a reflecting surface 49-1 made by depositing a film of metal such as aluminum by evaporation, and has the function of reflecting the light beam from the secondary optical system and deflecting it to the exit surface 49-21. The adjacent lenses of the secondary optical system 48 share a chord as a border line and are in contact with each other. By adopting such a construction, it becomes possible to secure a great lens diameter and increase the quantity of light. It is advantageous in mold working to set the diameters of the four secondary imaging lenses 48-1a, 48-1b, 48-1c and 48-1d in the central portion so as to coincide with one another at the points 53-1, 53-2, 53-3 and 53-4 at the ends of the chord shared by the outer peripheries of the adjacent lenses. Accordingly, where the shape of the stop 33 is made unequal in the upper and lower portions and the right and left portions thereof as shown in FIG. 6, the diameters of the upper and lower lenses and right and left lenses do not always coincide with each other.

Further, the radii of curvature of the lenses 48-1 in the central portion and the lenses 48-2 or 48-3 in the marginal portion may be equal to each other or differ from each other. There is a case where it is effective to make said radii of curvature not equal to each other, but different from each other. For example, the field lens 32 comprises three different areas as shown in FIG. 5 and therefore, the thickness and the way in which the light is deflected differ between the central portion and the marginal portion, and the length of the optical path up to the surface of the sensor 35 does not always coincide. So, in the central portion and marginal portion of each secondary imaging lens, the radii of curvature of that lens are made to differ from each other, whereby it becomes possible to form images well on the surface of the same sensor 35. Particularly, the light beam from the marginal portion follows an optical path somewhat inclined toward the center and therefore, generally, the length of the optical path of the marginal light beam up to the surface of the sensor 35 becomes great as compared with the central light beam and thus, it is effective to make the radii of curvature of the secondary imaging lenses 48-2 and 48-3 in the marginal portion thereof somewhat greater than in the central portion thereof. Also, if the spacing between the secondary optical system 48 and the stop 33 becomes wide, it is necessary to make each opening in the stop 33 small in order that the light beam may not reach the vicinity of the border line between the divided lenses, and it becomes difficult to secure a sufficient quantity of light. Therefore, in the present embodiment, each secondary imaging lens is constructed of a lens surface convex relative to the stop 33, and is disposed in contact with the stop 33.

The light transmitted through the secondary imaging lenses is downwardly deflected by the reflecting surface 49-1 of the prism member 49 and enters the sensor 50, but by adopting such a construction, it becomes possible to lengthen the length of the optical path from the secondary imaging lenses and onward in a limited space and keep the imaging magnification great to a certain degree. In the focus detecting system of the secondary imaging type, if the imaging magnification is small, the accuracy of focus detection will be reduced and therefore, it is desirable to secure, for example, an imaging magnification of ¼ time or greater. However, if the imaging magnification is too great, the sensor will become bulky and this is disadvantageous in terms of both space and cost and therefore, it may be said that it is necessary to make the imaging magnification smaller than at least one-to-one magnification.

As in the present embodiment, the optical path is filled up with the prism member 49 and the length of the optical path of the prism member 49 is varied, whereby it becomes possible to control the imaging magnification to a certain degree in a limited space and optimum design can be accomplished easily.

In the present embodiment, the secondary optical system 48 and the prism member 49 are made integral with each other, but they may be divided into two along a dotted line 54 in FIG. 8 and finally the two may be disposed in proximity to each other or adhesively secured to each other. The advantage in such a case will hereinafter be described.

First, it is necessary that the secondary imaging lenses form the secondary images regarding the object to be photographed at positions whereat the sensors are disposed, and for this purpose, the relative positional relation between the lenses must be accurately set as per the design value. However, considering a case where the secondary imaging lens and the prism member are formed of plastic or the like, if they are molded in their integral shape, the deformation due to the shrinkage during molding is liable to occur because they are great in volume and of a triangular shape, and it becomes difficult to obtain accurate moldings. Therefore, if they is divided into two and the secondary imaging lens is made into a nearly planar shape, it will become possible to reduce the influence of such shrinkage during molding.

Further, the influence of moisture absorption may be mentioned as a problem in a case where the prism member is formed of plastic. Generally, plastic materials such as acryl readily absorb moisture and suffer from expansion or a variation in refractive index. Where the refractive index varies uniformly over the entire prism member, the influence thereof is not so great, but if a distribution of the refractive index occurs toward the interior of the prism member due to the moisture absorption from the surface of the prism member, light rays transmitted through the interior will be bent and accurate focus detection will become difficult. Particularly, where the volume is relatively great like the prism member of the present embodiment, moisture absorption will progress to the interior and a long time will be required before a balanced state is brought about, and the influence thereof is great. So, if the secondary imaging lens and the prism member are divided into two and the secondary imaging lens which is little affected by moisture absorption is formed, for example, of acryl which is great in moisture absorption but good in moldability and heat resisting property and the prism member which is greatly affected by moisture absorption is formed of polycarbonate, polystyrene, MS resin or the like which is small in moisture absorption, it will become possible to reduce the influence thereof as a whole. Also, if the prism member is formed of glass, it will be more effective. The prism member is of a simple shape surrounded by flat surfaces and therefore, it is relatively easy to form it of glass.

Also, the secondary imaging lens and the prism member are divided into two and they are formed of plastics or glasses differing in abbe number and the two are cemented together with a curvature imparted to their joined surface as required, whereby it becomes possible to eliminate the chromatic aberration in secondary imaging.

Further, when cementing the secondary imaging lens and the prism member together, it is possible to insert an absorption type infrared cut filter therebetween. The absorption type infrared cut filter has a characteristic that it is inexpensive, easy to handle as compared with an evaporation type one, but poses a problem in its environment resisting property and is not usually used very much. Particularly, it is emulsified by moisture absorption and its characteristic is often deteriorated thereby, and it has been difficult to use such a filter in cameras which are used in severe environments. However, if an absorption type infrared cut filter is inserted between the secondary imaging lens and the prism member and the three are cemented together to shield the infrared cut filter from the atmosphere, the problem of moisture absorption as noted above will be solved and the use of such filter will become possible. The infrared cut filter 44 of FIG. 3 needs to be provided at a low position so that the light from the photographing lens 37 may not be reflected and imprinted on the film surface, and requires much space, but if the infrared cut filter 44 becomes unnecessary by inserting an absorption type infrared cut filter between the secondary imaging lens and the prism member, it will become very advantageous in making the focus detecting system compact.

As described above, according to the present invention, in the image deviation type focus detecting device, at least three pairs of secondary imaging lenses each forming a pair of secondary images are provided as a secondary optical system, and the design is made such that of the segments passing through the vertices of each pair of secondary imaging lenses, at least two segments intersect each other so as to be orthogonal to each other and at least one segment does not intersect, whereby there can be achieved a focus detecting device which can accomplish good distance measurement even for an object to be photographed having a variation in the distribution of the quantity of light and even in the areas other than the central portion of the photographing picture plane.

The field lens having an aspherical surface which has been described with reference to FIG. 5 has wider applicability not only to the construction of FIG. 1, but also to various constructions, and this point will now be described.

Figure 10:
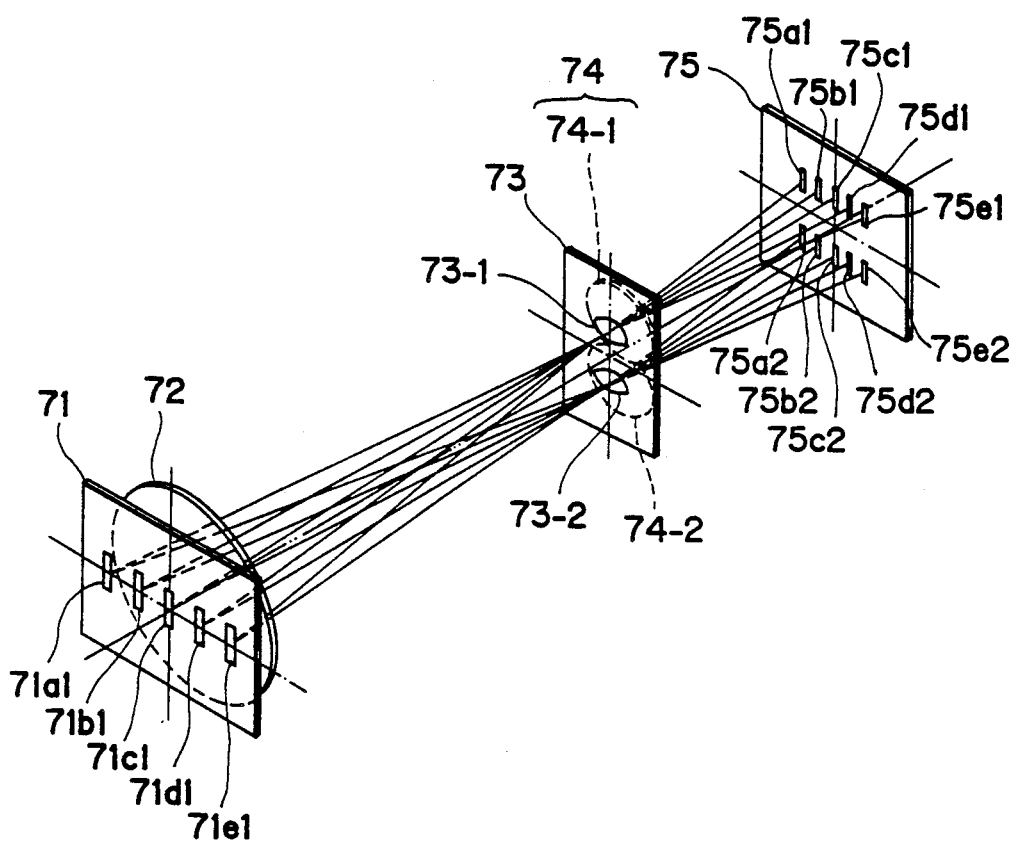
Figure 15:
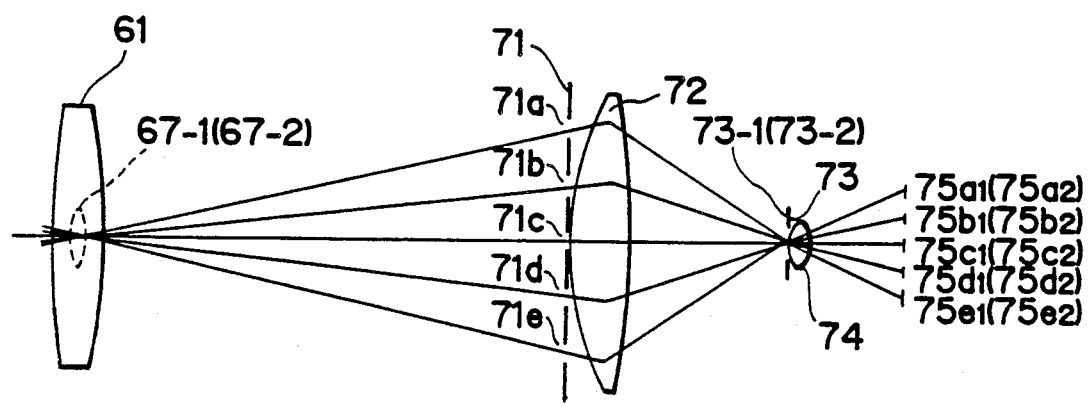
FIG. 15 is an optical sectional view of a focus detecting device of the conventional image deviation type.

FIG. 15 is a plan view of the focus detecting device of FIG. 10 as it is seen from above. As shown in FIG. 15, a field lens 72 has the function of imaging openings 73-1 and 73-2 in a stop 73 near the exit pupils 67-1 and 67-2, respectively, of an objective lens 61.

In a device for effecting focus detection for a plurality of areas of an object to be photographed which are formed by the objective lens 61, it is necessary to efficiently direct a light beam having entered the field lens 72 to the stop 73 of a secondary optical system 74, as shown in FIG. 15.

Generally, the field lens at this time needs to deflect greatly the light beam having entered the marginal portion of the lens and therefore, it has had the tendency that its curvature becomes sharper and correspondingly thereto, the center thickness of the lens becomes greater in order to secure the edge thickness of the lens sufficiently.

Generally, the focus detecting device needs to be incorporated into a limited space within a camera or the like and therefore, the full length of the optical system thereof cannot be made very great, and it is necessary to set the spacing between the field lens and the stop to less than ten and several millimeters to several tens of millimeters.

For this reason, particularly in the focus detecting device for a plurality of distance measuring points as shown in FIG. 10, it becomes important to make the field lens as compact as possible.

Figure 16:
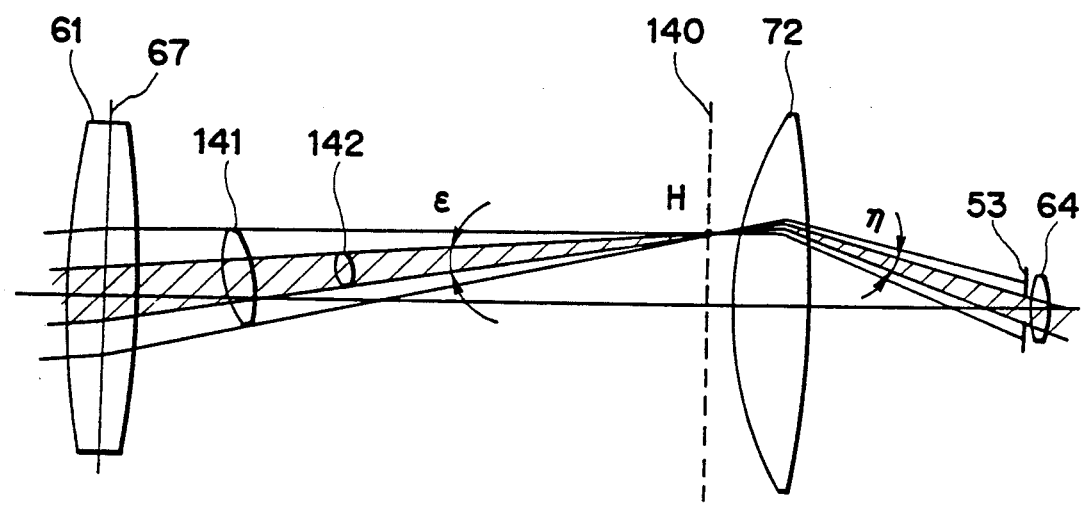
FIGS. 16 to 21 illustrate the light beam on the objective lens side in the focus detecting device of the conventional image deviation type.
Figure 17:
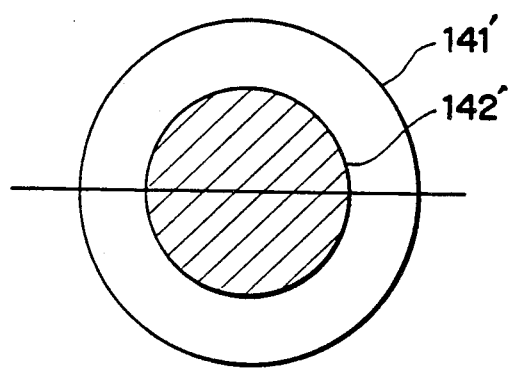

This, means that, as shown, for example, in FIG. 16, in the expanse 141 of a light beam from the objective lens imaged at a point H of a certain height in the predetermined focal plane 140 (hereinafter referred to as the "imaging light beam"), there is included a light beam to be imaged at the same point H and thereafter directed to the focus detecting device (hereinafter referred to as the "AF light beam"). Also, when considering the cross-section of each light beam on the exit pupil surface 67 of the objective lens of FIG. 16, it means that, as shown in FIG. 17, in an area 141' through which the imaging light beam 141 is transmitted, there is included an area 142' through which the light beam 142 for focus detection is transmitted.

Usually, however, in an objective lens such as a photographing lens, as the angle of view of the imaging light beam becomes greater, a part of the light beam which is to be transmitted through the aperture of the objective lens is eclipsed by the other portion of the objective lens and a so-called aperture eclipse occurs.

Figure 18:
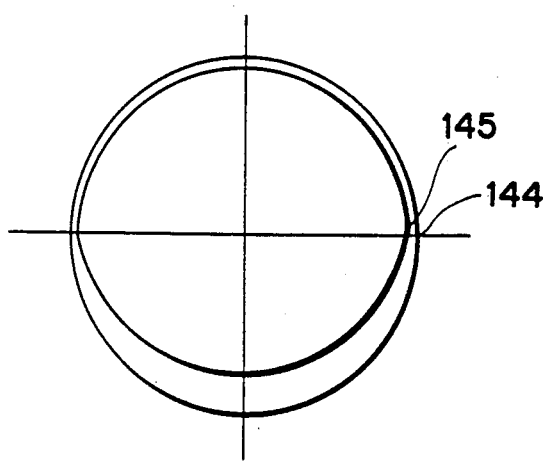

FIG. 18 shows an example of the aperture eclipse on the exit pupil surface of the objective lens. In FIG. 18, the reference numeral 144 designates an area through which the imaging light beam is transmitted when the angle of view is 0, and the reference numeral 145 denotes an area through which the imaging light beam is transmitted when the angle of view is great, for example, when the image height is about 6 mm. As is apparent from this figure, when the of view is great, the aperture eclipse is great and the area through which the imaging light beam is transmitted becomes small. Accordingly, in the focus detecting device as shown in FIG. 10 wherein all of a plurality of distance measuring fields share a stop, to satisfy the condition that the aforementioned light beam for focus detection is not eclipsed, it is necessary to set the stop of the focus detecting device sufficiently small in accordance with the marginal field of view in which the aperture eclipse is greatest. Therefore, the conventional focus detecting device has suffered from the problem that the brightness of the central field of view in which the aperture eclipse is small is sacrificed.

Figure 19:
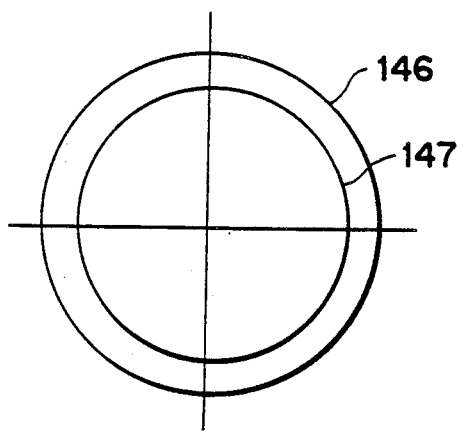
Figure 20:
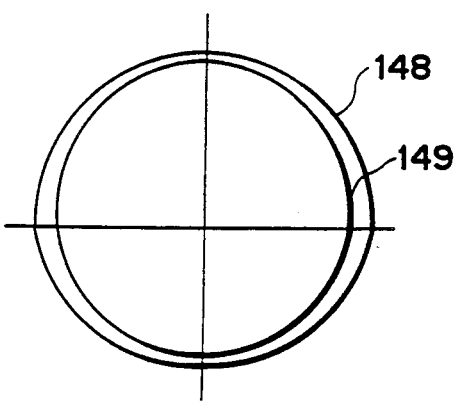
Figure 21:
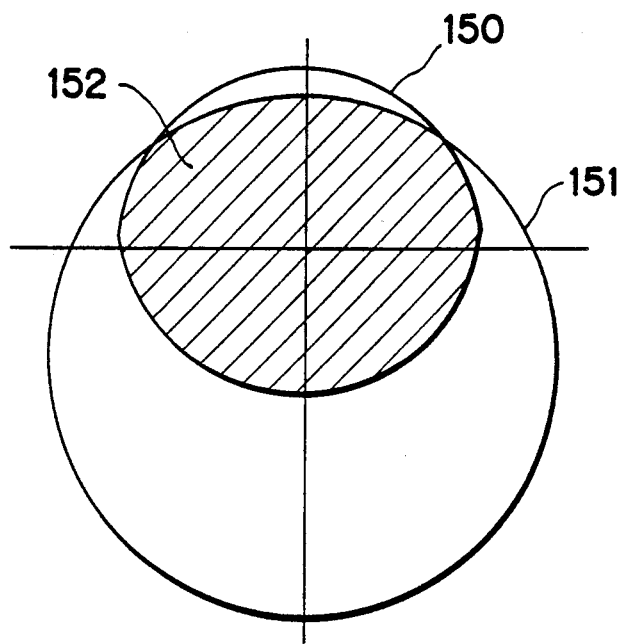

FIGS. 19 and 20 are illustrations showing those concepts. FIG. 19 shows the area on the exit pupil surface of the objective lens through which the imaging light beam 146 and the light beam 147 for focus detection are transmitted when the angle of view is 0, and FIG. 20 shows the area through which a similar imaging light beam 148 and a similar light beam 149 for focus detection at a high angle of view are transmitted. As shown in these figures, if the aperture is set in accordance with the aperture eclipse of a high angle of view, it will become impossible to effectively utilize the imaging light beam to its limit when the angle of view is 0.

Further, when such a focus detecting is applied to a camera in which the photographing lens is interchangeable, such as a single-lens reflex camera, there is the possibility that the position of the exit pupil is greatly changed by the photographing lens mounted on the camera, and in such a case, there is the problem that the area on the pupil surface through which the light beam of high angle of view for focus detection is to be transmitted is limited to a smaller range and the brightness in the field of view having a small angle of view is limited more and more.

For example, if the transmission area for the imaging light beam imaged at a position of an image height of about 6 mm is depicted on a certain crosssection perpendicular to the optic axis, the transmission area 151 of a lens which is bright and whose exit pupil position is considerably near deviates downwardly relative to the transmission area 150 of a dark lens whose exit pupil position is relatively far. Accordingly, in order that the light beam for focus detection may not be eclipsed for these two lenses, the design must be made such that the light beam for focus detection is transmitted through the common area 152 of the two transmission areas which is indicated by hatching, and this leads to a further reduction in the efficiency with which the imaging light beam is utilized as the light beam for focus detection.

Figure 11:
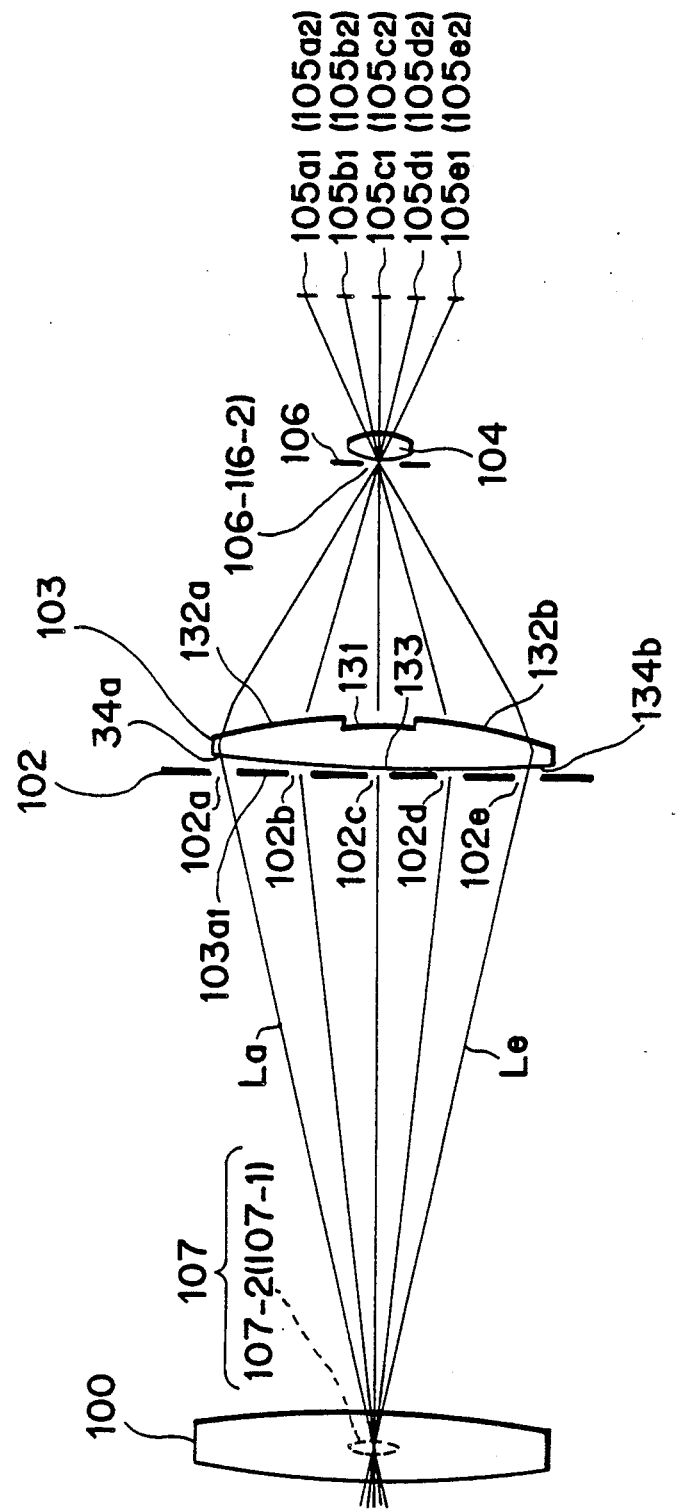
FIG. 11 is a plan view of the device of FIG. 10 as it is seen from above.
Figure 12A:
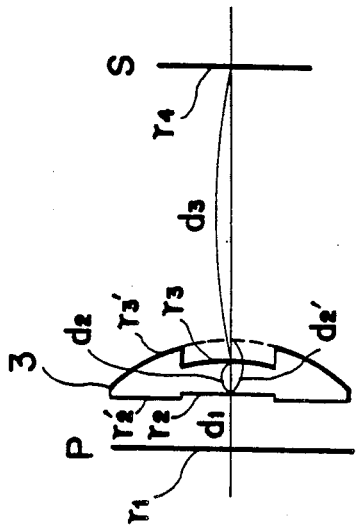
FIGS. 12A–12D are cross-sectional views of the lenses of numerical value embodiments 1–4 in the vicinity of a field lens according to the present invention.
Figure 12B:
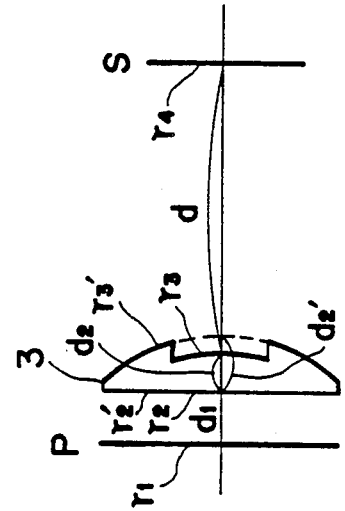
Figure 12C:
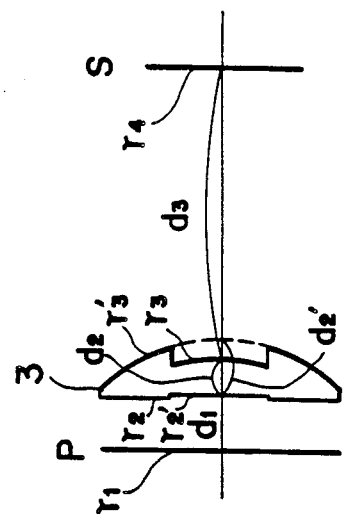
Figure 12D:
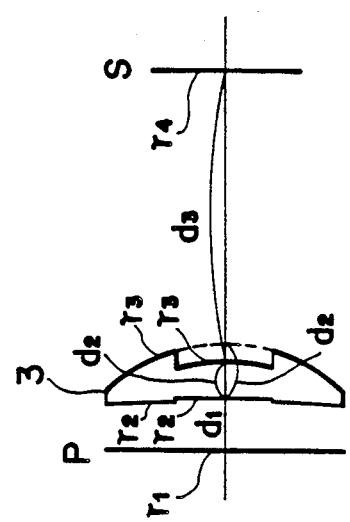

In the construction of FIG. 10, the lens configuration of a field lens 102, instead of the field lens 73, is comprised of a lens surface of different radius of curvature which is divided into a plurality of areas in a direction in which a plurality of distance measuring areas 102a–102e are provided as shown in FIG. 11, i.e., a socalled Fresnel surface, and the Fresnel surface of the area other than the optic axis L is comprised of an aspherical surface.

In FIG. 11, both lens surfaces of a field lens 103 are each comprised of three Fresnel surfaces 131, 132a, 132b and 133, 134a, 134b as a whole with the optic axis L interposed therebetween. Of these, the Fresnel surfaces 132a and 132b each are comprised of an aspherical surface.

As shown in FIG. 11, by particularly determining the shape of the field lens 103, the light beam from an objective lens 100, for example, light beams La and Le which have passed through openings 102a and 102e in a field stop 102 and have entered the marginal portion of the field lens 103 are efficiently directed to openings 106-1 and 106-2 in a stop 106. Thus, by a method similar to that described previously, good focus detection is effected in a plurality of areas.

By the construction as described above, in the cross-section of FIG. 16, the angle of expanse $\epsilon$ of the light beam for focus detection which must be set narrowly depending on the aperture eclipse and pupil position of the objective lens is enlarged to a widest possible angle $\eta$ by the field lens 103 and directed to the stop 53. Conversely, this corresponds to the fact that as the point H on the predetermined focal plane 140 becomes farther from the optic axis, the projected image of the stop formed on the objective lens side by the field lens 103 is compressed only in the vertical direction in FIG. 16 and is made into an elliptical shape approximate to the shape of the aperture eclipse. By making the field lens 103 into such a shape, it is possible to direct the light beam for focus detection most efficiently in accordance with the aperture eclipse which differs depending on each angle of view.

The variation in the angle of expanse of the light beam caused by the field lens 103 will now be described.

Figure 22:
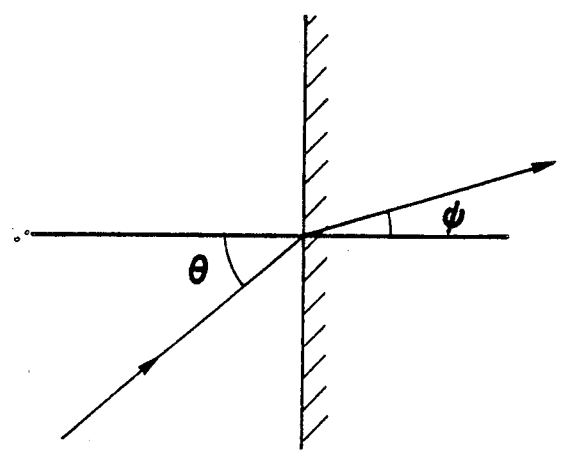
FIGS. 22 and 23 illustrate the well-known relation between the angle of incidence and the angle of refraction.

FIG. 22 shows a state in which a light incident on a medium of refractive index n at an angle $\theta$ is refracted at an angle $\phi$. As is well known, the relation between the angles $\theta$ and $\phi$ this time is expressed as $$\sin\theta = n \sin\phi. \tag{1}$$

Figure 23:
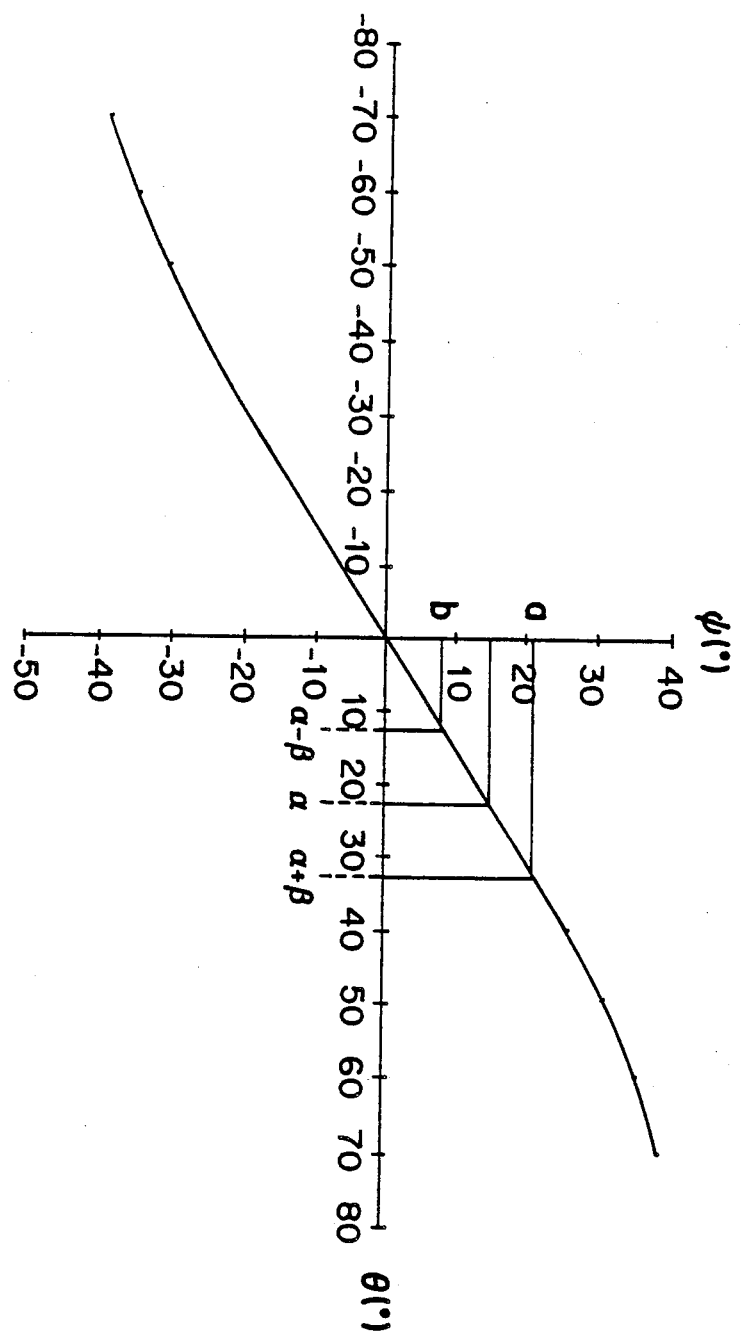

FIG. 23 shows the relation between $\theta$ and $\phi$ with n=1.5 in the equation (1) and with $\theta$ and $\phi$ plotted as abscissa and the ordinate, respectively, and represents how a light beam of a certain expanse incident on the medium of refractive index n changes into a light beam of what expanse and is refracted. As shown in FIG. 23, when for example, a light beam having an expanse of $\pm \beta$ degrees about an angle $\alpha$ is incident on the medium, the angle of expanse $\gamma$ of the light beam after being refracted is $$\gamma = a - b \tag{2}$$

with t values of points a and b in FIG. 23 being read.

That is, the expanse, after refraction, of a light beam incident on a medium whose refractive index n is greater than 1 always becomes narrower than the expanse of the incident light beam, but the degree to which it becomes narrow is smaller as the angle at which the central light ray of the incident light beam is incident on the medium becomes smaller. Conversely, when it emerges from the medium, the light beam expands without fail, but the degree to which it expands becomes greater as the angle at which the central light ray of the emergent light beam emerges from the medium becomes greater.

Therefore, where the field lens 103 is comprised of a single lens, a shape approximate to a plano-convex lens is advantageous as the shape of the field lens. This is because the light beam entering the field lens from the objective lens enters in a nearly horizontal state because the pupil position of the objective lens is far as compared with the height at which the light beam is imaged on the predetermined focal plane near the field lens and therefore, if the lens surface of the field lens is approximate to a plane, the angle of incidence of the light beam becomes smaller and the portion in which the angle of the light beam after being refracted decreases and becomes smaller.

On the other hand, the light beam emerging from the field lens toward a stop 106 is greatly deflected and caused to emerge by the lens surface being inclined in a direction in which the field lens becomes thicker toward the center thereof, in a case where the first surface of the field lens is approximate to a plane and is small in deflecting action, whereby the light beam is directed to the stop and thereby the expanse of the light beam after emerging is made great.

For the reason set forth above, the field lens is made into a shape approximate to a planoconvex shape by making the curvature of the front surface thereof weaker than the curvature of the rear surface thereof, and at least the lens surface RF adjacent to the stop 106 is made into a Fresnel surface divided into a plurality of areas and Fresnel surfaces 132a and 132b far from the optic axis L are made into aspherical surfaces to thereby accomplish optimization, and the conversion and deflection of the light beam width best suited for each angle of view is accomplished.

The numerical value embodiments 1-4 of the field lens and the cross-sectional view the lens in the respective numerical value embodiments are shown in FIGS. 12A-12D. In any of the numerical value embodiments 1-4, the lens surface of the field lens which is adjacent to the secondary optical system is comprised of a Fresnel surface divided into three areas.

In FIGS. 12A-12D, P designates the predetermined imaging plane of the objective lens, and S denotes the stop.

Also $\gamma_1$, $\gamma_2$, $d_1$, $d_2$, $d_3$, $\gamma_2'$, $\gamma_3'$ and $d_2'$ represent the regarding the shape of the field lens, $n_2$ represents the refractive index of the material, and aspherical surface coefficients A-E are the coefficients when the shape of the lens surface is expressed by the following equation when the direction of the optic axis is the X-axis and the direction orthogonal thereto is the Y-axis.

$$X = \gamma_0 \left(1 - \left(1 - \frac{Y^2}{\gamma_0^2}\right)^{\frac{1}{2}}\right) + AY^2 + BY^4 + CY^6 + DY^8 + EY^{10}$$

Numerical Value Embodiment 1

$\gamma_1 = \infty$         $d_1 = 3.8$
$\gamma_2 = 50.00$       $d_2 = 3$      $n_2 = 1.492$
$\gamma_2' = \infty$         $d_2' = 4.7$
$\gamma_3 = -12.34$     $d_3 = 21.8$
$\gamma_3'$ = aspherical surface
$\gamma_4 = \infty$ aspherical surface coefficient of $\gamma_3'$ $\gamma_0 = -25.29$      $A = -3.547 \times 10^{-2}$
$B = 2.066 \times 10^{-6}$   $C = 4.100 \times 10^{-6}$
$D = -6.869 \times 10^{-8}$  $E = 3.877 \times 10^{-10}$

Numerical Value Embodiment 2

$\gamma_1 = \infty$         $d_1 = 3.8$
$\gamma_2 = 50.00$       $d_2 = 3$      $n_2 = 1.492$
$\gamma_2' = -153.76$   $d_2' = 4.7$
$\gamma_3 = -12.14$     $d_3 = 21.8$
$\gamma_3'$ = aspherical surface
$\gamma_4 = \infty$ aspherical surface coefficient of $\gamma_3'$ $\gamma_0 = -21.56$      $A = -3.401 \times 10^{-2}$
$B = -2.828 \times 10^{-5}$   $C = 4.599 \times 10^{-6}$
$D = -6.961 \times 10^{-8}$  $E = 3.706 \times 10^{-10}$

Numerical Value Embodiment 3

$\gamma_1 = \infty$         $d_1 = 3.8$
$\gamma_2 = 50.00$       $d_2 = 3$      $n_2 = 1.492$
$\gamma_2' = 213.35$    $d_2' = 4.7$
$\gamma_3 = -12.14$     $d_3 = 21.8$
$\gamma_3'$ = aspherical surface
$\gamma_4 = \infty$ aspherical surface coefficient of $\gamma_3'$ $\gamma_0 = -22.84$      $A = -3.101 \times 10^{-2}$
$B = -2.626 \times 10^{-6}$   $C = 4.185 \times 10^{-6}$
$D = -6.976 \times 10^{-8}$  $E = 3.97033 \times 10^{-10}$

Numerical Value Empodiment 4

$\gamma_1 = \infty$         $d_1 = 3.8$
$\gamma_2 = \infty$         $d_2 = 3$      $n_2 = 1.492$
$\gamma_2' = \infty$         $d_2' = 4.7$
$\gamma_3 = -9.998$     $d_3 = 21.8$
$\gamma_3'$ = aspherical surface
$\gamma_4 = \infty$ aspherical surface coefficient of $\gamma_3'$ $\gamma_0 = -25.29$      $A = -3.547 \times 10^{-2}$
$B = 2.066 \times 10^{-6}$   $C = 4.100 \times 10^{-6}$
$D = -6.869 \times 10^{-8}$  $E = 3.877 \times 10^{-10}$ Each numerical value embodiment will now be described.

First, the marginal portion of the field lens of each numerical value embodiment is that when a field of view of height of about 6 mm on the predetermined focal plane is supposed. The feature of Numerical Value Embodiment 1 is that the Fresnel surface (lens surface) of the central portion of the field lens is comprised of a biconvex lens, the Fresnel surface (lens surface) of the marginal portion is comprised of a plano-convex lens and the convex Fresnel surface $\gamma_3'$ of the marginal portion is made into an aspherical surface. The aspherical shape is such a shape that the radius of curvature becomes greater toward the marginal portion.

Figure 13:
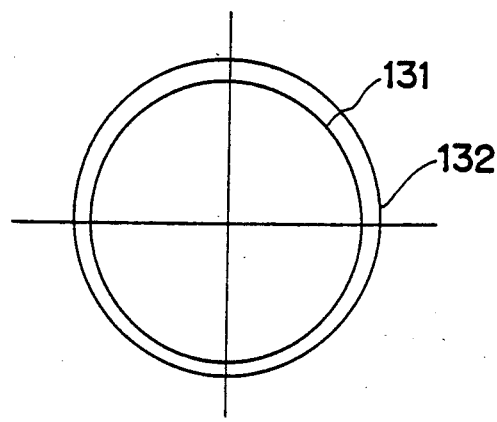
FIGS. 13 and 14 illustrate the diameters of a light beam at the exit pupil of an objective lens according to the present invention.
Figure 14:
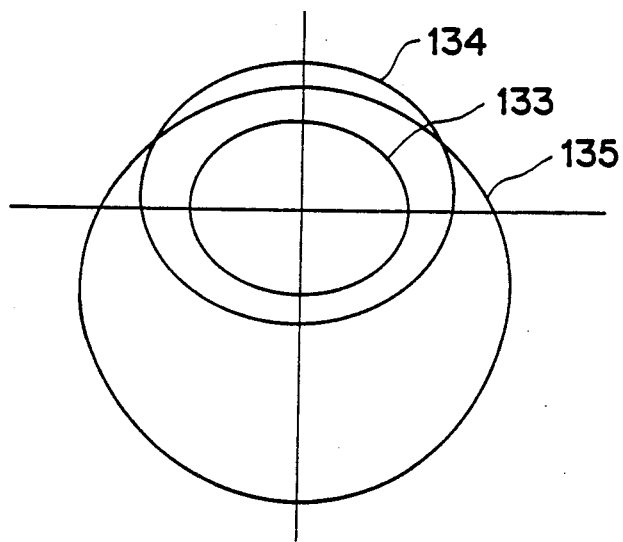

FIGS. 13 and 14 show the projected image of the stop of circular opening formed on the objective lens side when the field lens of Numerical Value Embodiment 1 is used.

In FIG. 13, the reference numeral 131 designates the projected image of the stop formed by a light beam passing at an image of height 0 mm, and the reference numeral 132 denotes the transmission area on the same surface for the light beam from the objective lens which is imaged at the same image height 0. As can be seen from this figure, the projected image 131 is included in the projected image 132 and therefore, the light beam for focus detection is not eclipsed by the objective lens.

On the other hand, in FIG. 14, the reference numeral 133 designates the projected image of the stop formed by a light beam passing at an image height of 6 mm, and the reference numerals 134 and 135 denote the transmission areas on the same surface for light beams from an objective lens having a far exit pupil and an objective lens having a near exit pupil which are imaged at the same image height. The projected image 133 is included in the area common to the areas 134 and 135 and therefore, again at this image height, the light beam for focus detection is not eclipsed by these two objective lenses.

Also, as is apparent from FIG. 14, by using the field lens of the present embodiment, the projected image of the stop having the same circular opening is formed in a substantially circular shape near the center and formed in an elliptical shape in the marginal portion and therefore, it is possible to make the opening in the stop sufficiently large, and it becomes possible to effectively utilize the light beam from the objective lens both near the center and in the marginal portion.

In Numerical Value Embodiment 2, the first surface $\gamma_2'$ of the marginal portion of the field lens is comprised of a concave surface. Generally, the exit pupil of the objective lens is at a finite distance of the order of 50 mm-200 mm and therefore, the central light ray of the beam entering the marginal portion of the field lens from the objective lens opens somewhat outwardly. Therefore, the first surface of the field lens is made somewhat concave so that this light beam may enter the first surface of the field lens as perpendicularly as possible thereto.

In Numerical Value Embodiment 3 the first surface $\gamma_2'$ of the marginal portion of the field lens is comprised of a convex surface. As described with respect to Numerical Value Embodiment 2, it is generally advantageous to make the first surface of the marginal portion of the field lens into a concave surface, but where it is possible to make the spacing between the field lens and the stop long, if this first surface is made somewhat convex and the balance between the curvatures of the two lens surfaces is kept, more light can be secured, and this is preferable.

In Numerical Value Embodiment 4, the first surface of the field lens has both its central portion and its marginal portion made into a common planar surface. If such a construction is adopted, where the field lens is formed, for example, of plastic, the mold structure therefor will become simple and the shortening of the time for making the mold and curtailment of the cost will become possible. The common surface is not limited to a planar surface, but may also be a spherical surface or an aspherical surface.

We claim:

1. A focus detecting device for detecting a focus condition of an objective lens, comprising:
    at least three pairs of secondary imaging lenses formed on an image plane side of the objective lens, each lens pair forming a pair of light distributions corresponding to an image of an object to be photographed, said three lens pairs being disposed so that at least two pairs of light distributions have light segments which intersect each other and at least one other pair of light distributions has light segments which do not intersect each other, each pair of secondary imaging lenses having lenses with contacting peripheral portions.

2. A focus detecting device according to claim 1, further comprising a fourth pair of secondary imaging lenses, and wherein two pairs of said secondary imaging lenses are disposed so that their light segments which pass through vertices of lens surfaces of said two pairs of secondary imaging lenses intersect each other in an area corresponding to a central portion of a photographing picture plane of the objective lens, and the other two pairs of said secondary imaging lenses are disposed substantially symmetrical with respect to the center of the photographing picture plane in the horizontal direction of a marginal portion of said picture plane.

3. A device for detecting the focusadjusted state of an objective lens, comprising:
    light controlling means disposed near a predetermined imaging plane of the objective lens and having apertures at a center and two sides of the picture plane;
    field lens means disposed near said light controlling means;
    sensor means provided with (a) paired sensor arrays disposed orthogonal to each other, and (b) paired sensor arrays disposed parallel to each other and disposed on opposite sides of said orthogonal sensors arrays, said sensor means forming a signal regarding the focus-adjusted state of the objective lens; and
    optical means for forming on respective ones of said orthogonal and parallel sensor arrays distributions of intensity of light having an interval therebetween which varies in conformity with the focus-adjusted state of the objective lens, said optical means having a set of secondary imaging optics disposed corresponding to each of said paired orthogonal and parallel sensor arrays.

4. A device according to claim 3, wherein each of said paired orthogonal and parallel sensor arrays comprises two sub-arrays.

5. A device according to claim 3, further comprising second light controlling mean disposed near said optical means and having sets of apertures corresponding to the respective sets of said secondary imaging optics.

6. A device according to claim 5, wherein one of the sets of apertures for controlling a light beam entering a corresponding set of secondary imaging optics forming a distribution of intensity of light on one of said paired orthogonal sensor arrays is greater than the other.

7. A device according to claim 3, wherein one of the set of secondary imaging optics forming a distribution of intensity of light on one of said paired orthogonal sensor arrays has a greater aperture than the other.

8. A device according to claim 7, wherein the set of secondary imaging optics having a greater aperture forms a distribution of intensity of light on one of said paired parallel sensor arrays.

9. A device according to claim 3, further comprising additional light controlling means for controlling the incidence of light onto light sensors at both sides of a light having emerged from the set of secondary imaging optics forming a distribution of intensity of light on a sensor array of said paired orthogonal sensor arrays which is parallel to the paired parallel sensor arrays.

10. A device according to claim 9, wherein said additional light controlling means comprises a light intercepting element having a plurality of apertures.

11. A device according to claim 10, wherein said light intercepting element has an aperture which comprises a light reflecting area and a non-reflecting area surrounding said aperture.

12. A device according to claim 3, wherein said field lens means is provided with (a) a central lens portion comprising a plurality of spherical surfaces, and (b) outer lens portions having at least one aspherical surface at both sides of said central lens portion.

13. A camera comprising:
    observation means for observing therethrough an image of an object formed by an objective lens;
    light controlling means disposed near a predetermined imaging plane of the objective lens and having apertures at a center and on both sides of a picture plane;
    field lens means disposed near said light controlling means;
    sensor means provided with (a) paired sensor arrays disposed orthogonal to each other, and (b) paired sensors arrays disposed parallel to one another and being disposed at both sides of said orthogonal sensor arrays, said sensor means forming a signal regarding a focus-adjusted state of the objective lens;
    optical means for forming on respective pairs of said orthogonal and parallel sensor arrays distributions of intensity of light having an interval therebetween which varies in conformity with the focus-adjusted state of the objective lens, said optical means having a set of secondary imaging optics discussed corresponding to each of said paired orthogonal and parallel sensor arrays; and
    distributing means for distributing light to said observation means and said field lens means.

14. A camera according to claim 13, further comprising first and second reflecting surfaces disposed between said light controlling means and said optical means, and wherein an optical path entering said first reflecting surface and an optical path emerging from said second reflecting surface intersect each other.

15. A device according to claim 3, wherein a pair of secondary imaging optics located at a center of said optical means has a smaller curvature of lens surface than a pair of secondary imaging optics located outside the center.

16. A camera according to claim 3, wherein a pair of secondary imaging optics located at a center of said optical means has a smaller curvature of lens surface than a pair of secondary imaging optics located outside the center.

17. A device according to claim 3, wherein said field lens means has a single optical axis.

18. A camera according to claim 13, wherein said field lens means has a single optical axis.

* * * * *

UNITED STATES PATENT AND TRADEMARK OFFICE
CERTIFICATE OF CORRECTION

PATENT NO. : 4,992,819

DATED : February 12, 1991

INVENTOR(S) : Keiji Ohtaka et al.

It is certified that error appears in the above-identified patent and that said Letters Patent is hereby corrected as shown below:

COLUMN 2:

Line 36, "75e1:" should read --75e1--.

COLUMN 8:

Line 36, "is" should read --are--.

COLUMN 10:

Line 45, "the of" should read --the angle of--.

COLUMN 12:

Line 24, "t values" should read --the values--.

COLUMN 13:

Line 4, "view" should read --views of--.

Line 32, "$\gamma 3 = -12.34$" should read --$\gamma 3 = -12.14$--.

UNITED STATES PATENT AND TRADEMARK OFFICE
CERTIFICATE OF CORRECTION

PATENT NO. : 4,992,819

DATED : February 12, 1991

INVENTOR(S) : Keiji Ohtaka et al.

It is certified that error appears in the above-identified patent and that said Letters Patent is hereby corrected as shown below:

COLUMN 14:

Line 58, "Embodiment 3" should read --Embodiment 3,--.

COLUMN 15:

Line 39, "focusadjusted" should read --focus-adjusted--.

Signed and Sealed this

Fifteenth Day of September, 1992

Attest:

DOUGLAS B. COMER

Attesting Officer

Acting Commissioner of Patents and Trademarks